(12) United States Patent
Baumann et al.

(10) Patent No.: US 7,873,473 B2
(45) Date of Patent: Jan. 18, 2011

(54) MOTOR VEHICLE HAVING A PREVENTIVE PROTECTION SYSTEM

(75) Inventors: Karl-Heinz Baumann, Bondorf (DE); Michael Fehring, Neuhausen (DE); Rainer Justen, Altdorf (DE)

(73) Assignee: Daimler AG, Stuttgart (DE)

( * ) Notice: Subject to any disclaimer, the term of this patent is extended or adjusted under 35 U.S.C. 154(b) by 265 days.

(21) Appl. No.: 11/663,500

(22) PCT Filed: Sep. 20, 2005

(86) PCT No.: PCT/EP2005/010107
§ 371 (c)(1),
(2), (4) Date: Jun. 24, 2009

(87) PCT Pub. No.: WO2006/032445
PCT Pub. Date: Mar. 30, 2006

(65) Prior Publication Data
US 2009/0299576 A1 Dec. 3, 2009

(30) Foreign Application Priority Data
Sep. 24, 2004 (DE) .................. 10 2004 046 360

(51) Int. Cl.
*B60R 22/00* (2006.01)
(52) U.S. Cl. .................. 701/301; 701/45; 180/274
(58) Field of Classification Search .......... 701/301, 701/45; 304/436; 180/274
See application file for complete search history.

(56) References Cited

U.S. PATENT DOCUMENTS

| 6,721,659 | B2 * | 4/2004 | Stopczynski ........... 701/301 |
| 7,343,235 | B2 * | 3/2008 | Isaji et al. ............ 701/45 |
| 2003/0111287 | A1 | 6/2003 | Enomoto |
| 2003/0149530 | A1 * | 8/2003 | Stopczynski .......... 701/301 |
| 2005/0004719 | A1 | 1/2005 | Dickmann et al. |
| 2005/0236816 | A1 | 10/2005 | Justen et al. |
| 2006/0250297 | A1 * | 11/2006 | Prakah-Asante et al. ... 342/70 |

(Continued)

FOREIGN PATENT DOCUMENTS

DE 44 11 184 C2 6/1998

(Continued)

OTHER PUBLICATIONS

International Search Report dated Mar. 8, 2006 with an English translation of the pertinent portions (Fifteen (15) pages).

(Continued)

*Primary Examiner*—Mark Hellner
(74) *Attorney, Agent, or Firm*—Crowell & Moring LLP

(57) ABSTRACT

A motor vehicle preventive protection system comprises a plurality of safety devices which are actuated as a function of information from at least one vehicle surroundings detection device. The time remaining prior to a collision is determined when the information from the vehicle surroundings detection device represents an anticipated collision with a collision object. Associated activation times for at least two of the actuators assigned to the safety devices are stored and the time remaining prior to the collision is compared with the activation times. At least one safety device is activated if the time remaining prior to the collision is shorter than or equal to at least one of the activation times of the actuators.

18 Claims, 3 Drawing Sheets

U.S. PATENT DOCUMENTS

2009/0187290 A1* 7/2009 Moriizumi et al. ............ 701/1

FOREIGN PATENT DOCUMENTS

| DE | 196 47 660 A1 | 6/1998 |
| DE | 197 29 960 A1 | 11/1998 |
| DE | 197 24 101 A1 | 12/1998 |
| DE | 198 13 943 A1 | 9/1999 |
| DE | 198 22 184 A1 | 11/1999 |
| DE | 198 42 827 A1 | 3/2000 |
| DE | 100 65 518 A1 | 7/2002 |
| DE | 101 21 386 C1 | 8/2002 |
| DE | 102 12 963 A1 | 10/2003 |
| DE | 102 31 362 A1 | 1/2004 |
| DE | 102 34 844 A1 | 2/2004 |
| DE | 102 46 800 A1 | 4/2004 |
| DE | 102 52 180 A1 | 5/2004 |
| DE | 103 03 147 A1 | 7/2004 |
| DE | 103 09 715 A1 | 9/2004 |
| DE | 103 37 620 A1 | 3/2005 |
| DE | 103 26 431 A1 | 1/2006 |
| EP | 0 952 459 A2 | 10/1999 |
| EP | 1 577 177 A1 | 9/2005 |
| WO | WO 2004/058546 A1 | 7/2004 |

OTHER PUBLICATIONS

German Search Report dated Mar. 22, 2005 with an English translation of the pertinent portions (Eight (8) pages).

* cited by examiner

MOTOR VEHICLE HAVING A PREVENTIVE PROTECTION SYSTEM

BACKGROUND AND SUMMARY OF THE INVENTION

This application is a national stage of PCT International Application No. PCT/EP2005/010107, filed Sep. 20, 2005, which claims priority under 35 U.S.C. §119 to German Patent Application No. 10 2004 046 360.3, filed Sep. 24, 2004, the disclosure of which is expressly incorporated by reference herein.

The invention relates to a motor vehicle having a preventive protection system that includes safety devices that are actuated in response to information from at least one vehicle surroundings detection device.

Motor vehicles, in particular passenger cars, are equipped in practice with active and passive safety devices which are already effective in a preventive fashion before a possible collision and use what is referred to as a pre-crash phase (i.e., the period of time starting from the detection (by corresponding detection systems in the vehicle) of a high probability of a collision up to the actual collision) to expand the protection of vehicle occupants and, if appropriate, of other parties to an accident by means of additional safety measures, and thus alleviate the severity of an accident. Such preventive protection systems, which are also referred to as PRE-SAFE™ systems, use information made available by various sensor devices of the motor vehicle in order to detect possible accident situations.

A significant component of such a preventive protection system is a vehicle surroundings detection sensor system which is known in a wide variety of embodiments.

For example, European patent document EP 0 952 459 A2 describes a device for sensing objects for motor vehicles, which includes a distance sensor system formed from a plurality of distance sensors. The distance sensors are arranged on the motor vehicle in such a way that they sense the surroundings of the motor vehicle. Furthermore, an evaluation unit is provided which determines the movement path and the speed of an object relative to the motor vehicle from the data of the distance sensor system, and it is optionally possible to actuate the distance sensors by means of the evaluation unit and to vary the range and/or the measurement repetition frequency and/or the resolution and/or the method of operation of the distance sensors. This device can make available data for various driver assistance devices simultaneously or successively and use it as a pre-crash sensor system.

German patent document DE 197 29 960 A1 describes a method for impact detection, in particular in motor vehicles for activating vehicle occupant protection devices, at least one pre-crash sensor being provided which registers the change in the relative velocity and/or the relative distance from objects within a predefined vicinity of the surroundings of the vehicle. If the change in the relative velocity which is sensed by the pre-crash sensor exceeds at least one predefined threshold value and/or the relative distance drops below a predefined threshold value, this is detected as being a state which is critical for safety and the triggering threshold is lowered.

A further method for triggering restraint means in a motor vehicle in the event of an impact or a collision with an object is disclosed in German patent document DE 100 65 518 A1. Within the scope of this known method, the time profile of the acceleration is sensed in the form of at least one acceleration signal, and the time profile of a velocity is generated from the acceleration signal. Restraint means are triggered in a way which is adapted to the specific impact situation by virtue of the fact that the impact velocity and the impact time are already detected before the impact using a pre-crash sensor system, that the impact situation is classified by means of the impact velocity, that the classification of the impact situation is used to determine a triggering time window in which the time profile of the velocity is generated, and that, in parallel with this, a threshold value for the velocity is determined from the acceleration signal, the classification of the impact situation being taken into account. Within the scope of the pre-crash sensing system it is possible here to use, for example, radar measurements, infrared measurements or else optical measuring methods.

An example of a pre-crash sensing system with an image sensing device for optically sensing objects which are spaced apart is disclosed in German patent document DE 198 42 827 A1.

However, all the known types of vehicle surroundings detection devices have in common the disadvantage that, depending on the technology and system design, they detect (with a greater or lesser frequency) an object which is present only in a virtual way, so that they then thus trigger a "false alarm" while, on the other hand, an actual object which is relevant to a crash is possibly not detected. As a result, the triggering of vehicle occupant protection systems is delayed and possibly occurs only at the impact so that there is no time for conditioning the vehicle restraint systems and vehicle occupants for the impending accident in an optimum way.

A further approach to actuating safety devices is to evaluate driving state data.

A motor vehicle with a preventive protection system which operates in this way is disclosed, for example, in German patent document DE 101 21 386 C1. In this context, the driving state data is monitored for a state of emergency braking, and when a state of emergency braking is determined the vehicle occupant protection system is actuated. In addition, a data processing device determines the state of oversteering and the state of understeering. If the data processing device detects emergency braking, oversteering and/or understeering, the reversible vehicle occupant protection system is actuated. The sensor system for sensing the driving state data which is evaluated for this purpose can comprise a steering angle sensor, a pedal travel sensor, a brake pressure sensor, a wheel speed sensor, an acceleration sensor and a yaw rate sensor.

Furthermore, the activation time, that is the time which an actuator requires to generate the protective effect of a safety device, can be included in the actuation of a preventive protection system in terms of an estimated time up to the vehicle collision.

German patent document DE 44 11 184 C2 describes a passenger restraint belt system for use in a vehicle seat, having a device for measuring the distance and velocity of the vehicle relative to an object, and having a device for calculating a time after which a vehicle collision with the object is anticipated, as well as a control unit for generating a control signal which is output to a seatbelt pretensioner and which increases the force of the seatbelt pretensioner in good time if a vehicle collision is anticipated. In this context, a considerable risk for a vehicle collision is anticipated if the estimated time up to the collision (TTC, time to collision) lies within a range which is defined between a time which the seatbelt pretensioner requires at maximum until a certain protective level is reached, and a time which is somewhat longer than the maximum time required to reach the predefined protective level.

One object of the invention is to provide a motor vehicle with a preventive protection system of the type described above, with a triggering behavior of the safety devices which takes into account different activation times of the actuators of safety devices.

This and other objects and advantages are achieved by the preventive detection system according to the invention, in which associated activation times for at least two of the actuators assigned to the safety devices are stored and the time (TTC) remaining up to the collision is compared with said activation times. At least one safety device is activated if the remaining time (TTC) up to the collision is shorter than or equal to at least one of the activation times of the actuators.

According to the invention the preventive protection system is actuated prior to a collision not only on the basis of the approaching of an object which is determined by the sensor system of the vehicle surroundings detection device but also takes into account the triggering behavior of the safety device itself which is decisively determined by the necessary activation time of the actuators used.

This solves the problem that in actuators with different activation times such as, for example, approximately 1000 msec for putting the backrest in an upright position,
500 msec for automatically initiated emergency braking in order to reduce kinetic energy (crash braking),
100 msec for an active headrest,
300 msec for active upholstery elements, and approximately
100 msec or more for a reversible seatbelt pretensioner, a triggering decision which is based solely on the longest activation time is unsuitable. In a highly dynamic driving situation such as, for example, lane changing or a crossroads in particular, a collision object possibly only enters the sensing range of the vehicle surroundings detection device only very late (i.e., just before the collision). It may then be too late to trigger safety devices in good time with activation times TTA which are longer than the time TTC remaining up to the collision. According to the invention, the time TTC remaining up to the collision is classified in the series of stored activation times TTA of the actuators, which permits differentiated activation of the actuators, for example as a function of whether or not the actuator still has sufficient time TTA to generate the protective effect of the assigned safety device.

Different signal-processing algorithms can be used to determine the remaining time TTC up to the collision with the collision object, it being an objective of each algorithm to determine the remaining time up to the collision as precisely as possible in order to keep the number of incorrect situation interpretations as low as possible. A simple calculation of the remaining time TTC up to the collision can take the form of the time TTC being determined from the quotient of a relative distance between the collision object and the motor vehicle and the relative velocity between the collision object and the motor vehicle. However, more complex algorithms which include, for example, the mass inertia, braking effect, coefficient of friction, can also be used.

According to an embodiment of the invention, those actuators whose activation time TTA is shorter than or equal to the remaining time TTC up to the collision are activated simultaneously or successively. This has the advantage that it is not necessary to activate actuators whose activation time is not sufficient to generate a protective effect within the remaining time up to the collision. This spares the on-board electrical system of the vehicle and prevents interactions with protective measures which are triggered when the crash event starts to occur.

In one embodiment of the invention, the sequence of triggering the actuators can take place in accordance with their stored activation times by virtue of the fact that when the remaining time TTC expires or is shortened, in each case that actuator whose activation time TTA is equal to the remaining time TTC is activated, the enquiry about identity of course corresponding to an enquiry about a state within a value interval. It is possible, after a first value for the time TTC has been determined, by means of a timer to count down as far as the crash (time lapse), or in order to determine the time TTC measurements are carried out continuously and the value adjusted up to the crash (time shortening process). According to this system, each actuator is activated only at the last possible time. This may be advantageous if this allows time to be gained for the detection and analysis of the situation.

In another embodiment of the invention, first that actuator which has the longest of all the activation times TTA which are shorter than or equal to the remaining time TTC is determined as being the actuator which triggers first. This is the "slowest" actuator which can still generate a full protective effect. The actuators are then activated in accordance with a cascading rule which is referred to the actuator which triggers first. In the cascading rule it is possible to define the time of triggering of the actuator which triggers first (immediately or only when TTC=TTA), the activation of actuators whose assigned protective devices can no longer generate a full protective effect (immediately or with the actuator which triggers first or not at all) and the activation of actuators with shorter activation times for which it is also possible to store a time delay of the activation, for example referred to the activation of the actuator which triggers first (post-cascading).

For example it is possible to store information indicating that after a crash braking process has been activated 600 msec before an imminent frontal impact, the seatbelt pretensioner is activated at a time interval of 300 msec. It is also possible to store information indicating that the seatbelt pretensioner is activated at the same time as the crash braking process in order to hold back the occupants when a braking effect starts.

For example, it is also possible to store information indicating that a backrest upright positioning process is initiated 1000 msec before an imminent rear end impact, the headrest is activated after 800 msec and the reversible seatbelt pretensioner is activated after a further 100 msec.

The range of the sensors of the vehicle surroundings detection device and their sampling rate have to be suitable to supply an algorithm with sufficient reference points for determining the instantaneous traffic situation and to activate an actuator of an assigned safety device sufficiently early.

In one advantageous embodiment of the invention as claimed in claim 8, the vehicle surroundings detection device is configured to a minimum sensor range S_min which is determined according to the formula $$S\_min = v\_rel\_max * (TTA + (Z*A))$$

i.e., from the product of a predefined maximum relative velocity v_rel_max and a time value which corresponds to the necessary activation time TTA of the actuator of an assigned safety device plus a necessary cycle time Z of the vehicle surroundings detection device multiplied by a necessary number A of sampling processes.

In another embodiment of the invention, the reactions of the driver and of the vehicle are additionally included in the overall system composed of the sensor system, algorithm system and actuator system in order to evaluate the criticality of the driving state with respect to a vehicle collision. This permits a comprehensive driver-vehicle-surroundings evaluation, on the basis of which selective actuation of the preventive safety devices within the scope of unavoidable collisions is possible. Possible interference variables which can occur in particular with stationary objects, for example as a result of reflections in the ground area, can be differentiated significantly from real collision objects if the driver behavior/vehicle behavior is used for collision plausibility checking.

The driver behavior/vehicle behavior can be analyzed, for example, by reference to driving state data which covers a steering angle sensor, a pedal travel sensor, a brake pressure sensor, a wheel speed sensor, an acceleration sensor, a yaw rate sensor or some other suitable sensor system. When checking the plausibility, the driver behavior is particularly important since when a collision object is detected a driver exhibits typical reactions which can be used to check the plausibility of the collision.

The data which represents a driver behavior/vehicle behavior when there is an imminent collision includes an accelerator pedal position and/or an accelerator pedal movement, a brake pedal position and/or a brake pedal movement, a steering movement, oversteering or understeering of the vehicle in terms of the steering angle or physiological data which makes it possible to conclude that the driver is experiencing a panic reaction and thus has detected a potential collision object. For all these variables it is possible to predefine threshold values and combinations which have to be exceeded or satisfied in order to check the plausibility of a collision object which has been detected by the vehicle surroundings detection device.

Thus, in one advantageous embodiment of the invention, the data evaluation and control device can output a collision plausibility value if a brake pedal is activated with a brake pedal speed which is greater than a predefined threshold value, such as is the case for example when what is referred to as emergency braking occurs.

Furthermore, the data evaluation and control device can conclude that a collision is imminent if the accelerator pedal is moved with a speed which exceeds a predefined speed threshold, and the brake pedal is activated within a predefined time of preferably a few 100 ms after the driver's foot has been removed from the accelerator pedal.

A collision can also be assumed to be plausible if a limiting value, which is related to an actual velocity of the motor vehicle, for a steering wheel speed and/or a steering wheel acceleration is exceeded for a specific time. Here, a manipulated variable can be determined from the steering wheel speed or the steering wheel acceleration or from both variables together, and a collision can be assumed to be plausible if the manipulated variable exceeds an adjustable value.

In one advantageous embodiment of the invention it is also possible to provide for the data evaluation and control device to output a collision plausibility value if an operator control activity of an operator control element exceeds a predefined time, since when, for example, a driver operates a radio or some other entertainment device, an air conditioning system, a telecommunications device or some other system or switch, he is briefly distracted from the driving task, and this is a reason for a higher probability of an accident.

Furthermore, the data evaluation and control device can also output a collision plausibility value if physiological data of the driver corresponds to predefined physiological data which indicates that the driver has recognized a collision object. In the event of what is referred to as a panic reaction, which occurs when the driver recognizes that an accident is directly imminent, numerous kinds of physiological data of the driver change significantly, such as for example his pulse rate and perspiration behavior. Determining such a panic reaction, for example by means of a measurable increase in the pulse rate of the driver using sensors integrated into the steering wheel, such as are also known, for example, in sporting equipment, provides infallible plausibility verification for the actual presence of a collision object which has been determined by the vehicle surroundings detection device.

In order to avoid ruling out basically all collisions in which there is no reaction on the part of the driver, the vehicle behavior is also analyzed according to the invention, in which case, for example, the collision is plausible if the velocity of an actual collision object referred to the velocity of the motor vehicle itself is higher than a predefined limiting value, for example +/−1 km/h. This limiting value is determined according to the measuring accuracy of the velocity measurement of the surroundings sensor system, the velocity of the motor vehicle itself being a reference variable.

The vehicle surroundings detection device can operate with any type of surroundings-sensing sensors. In this context it is possible to use sensors on an electromagnetic basis which operate with radar waves, millimeter waves or micrometer waves, on an optical basis such as lidar systems or infrared systems, and on an imaging basis such as, for example, video in mono or stereo. Of course, it is also possible to use a combination of such sensors and of the information acquired from them in order to improve the quality of the information. The sensors of the vehicle surroundings detection device have to supply the physical variables of distance and/or velocity between the motor vehicle and the collision object, it being possible to calculate one of the variables in each case by means of mathematical differentiation or integration. Owing to the fixed arrangement of the sensors with respect to the vehicle, the variables which are measured in this way are always relative variables between the vehicle and the sensed collision object.

The sensors which are used in the motor vehicle which is equipped according to the invention can be sensors which are known per se, are installed in series-produced vehicles, are suitable for resolving normal traffic conditions with sufficient precision, and which make their signals continuously available at least under normal weather conditions.

The monitored region is determined by the arrangement of the sensors of the vehicle surroundings detection device, sensors being arranged in particular at the front and rear of the motor vehicle, in order to monitor in particular traffic on the left. However, it is also conceivable to arrange sensors on the sides of the vehicle in order to detect lateral collisions.

In order to trigger the preventive safety devices as far as possible only within the scope of unavoidable collisions, the vehicle surroundings detection device must supply information about the position of the collision object which is as accurate as possible and which, by means of information about the driver's own lane, permits differentiation between traveling closely past, an avoidance maneuver and an imminent collision with the degree of overlap during the collision. For this purpose it is advantageous if an offset of the collision object in the lateral direction or Y direction of the motor vehicle is determined directly by means of the sensors of the vehicle surroundings detection device. However, this information which represents an anticipated collision with a collision object can, if appropriate, also be determined mathematically.

A particularly advantageous device and a method for determining the position of objects in the surroundings of a vehicle which is also suitable for a motor vehicle according to the present invention is described in German patent document DE 103 26 431 to whose entire contents reference is made.

Basically, actuating safety devices according to the invention is suitable for all safety devices provided in a vehicle, it being possible for said devices to be, for example, a reversible seatbelt pretensioner, an electric seat adjustment device, decorative elements which are adjustable in terms of their shape, size and/or position or restraining upholstered elements, in particular knee upholstered elements, or other vehicle components which can be adjusted electrically, hydraulically or pneumatically in order to increase safety. The safety devices also comprise functionalities such as, for example, the closing of an opened sunroof or opened vehicle windows in order to minimize the risk of intruding parts or of body parts hanging out. Further safety devices can be the configuration of a brake system to minimize the crash energy and to secure the vehicle occupants more firmly when there is an unavoidable collision, by actuating an autonomous emergency braking process just before the start of the collision.

An active knee protection device for preventively securing vehicle occupants in the lap region according to German patent document DE 102 52 180 and an active headrest for preventively securing the head of the vehicle occupants according to German patent document DE 102 34 844 are particularly suitable for use with a motor vehicle which is equipped according to the invention.

Furthermore, protection means which serve to protect other parties to a collision such as pedestrians and cyclists, for example an adjustable engine hood, movable bumpers and impact elements of adjustable hardness on the outer skin of the vehicle, can also be activated. It is also possible to provide for corresponding interventions in the ride level control system and the brake system and steering system.

A vehicle height adjustment means which is suitable for application in the preventive protection system according to the present invention when there are parties to a collision with vehicles of different heights with the aim of improving the crash compatibility is described, for example, in German patent document DE 103 37 620.

The actuation of the corresponding safety device can be made more precise and adapted to the respective situation if it is carried out as a function of determined physiological variables of a vehicle occupant. These include, in particular, the size of vehicle occupants and their weight. This data can be determined by means of a weight detection device which is connected to the data evaluation and control device and a body size detection device, it being possible to embody the weight detection device integrally with a seat occupation detection device and to embody the body size detection device with, for example, a seat position sensor system and a, for example, optical head position determining device.

Further advantages and advantageous refinements of a motor vehicle according to the invention can be found in the description, the drawing and the patent claims.

Other objects, advantages and novel features of the present invention will become apparent from the following detailed description of the invention when considered in conjunction with the accompanying drawings.

DETAILED DESCRIPTION OF THE DRAWINGS

Figure 1:
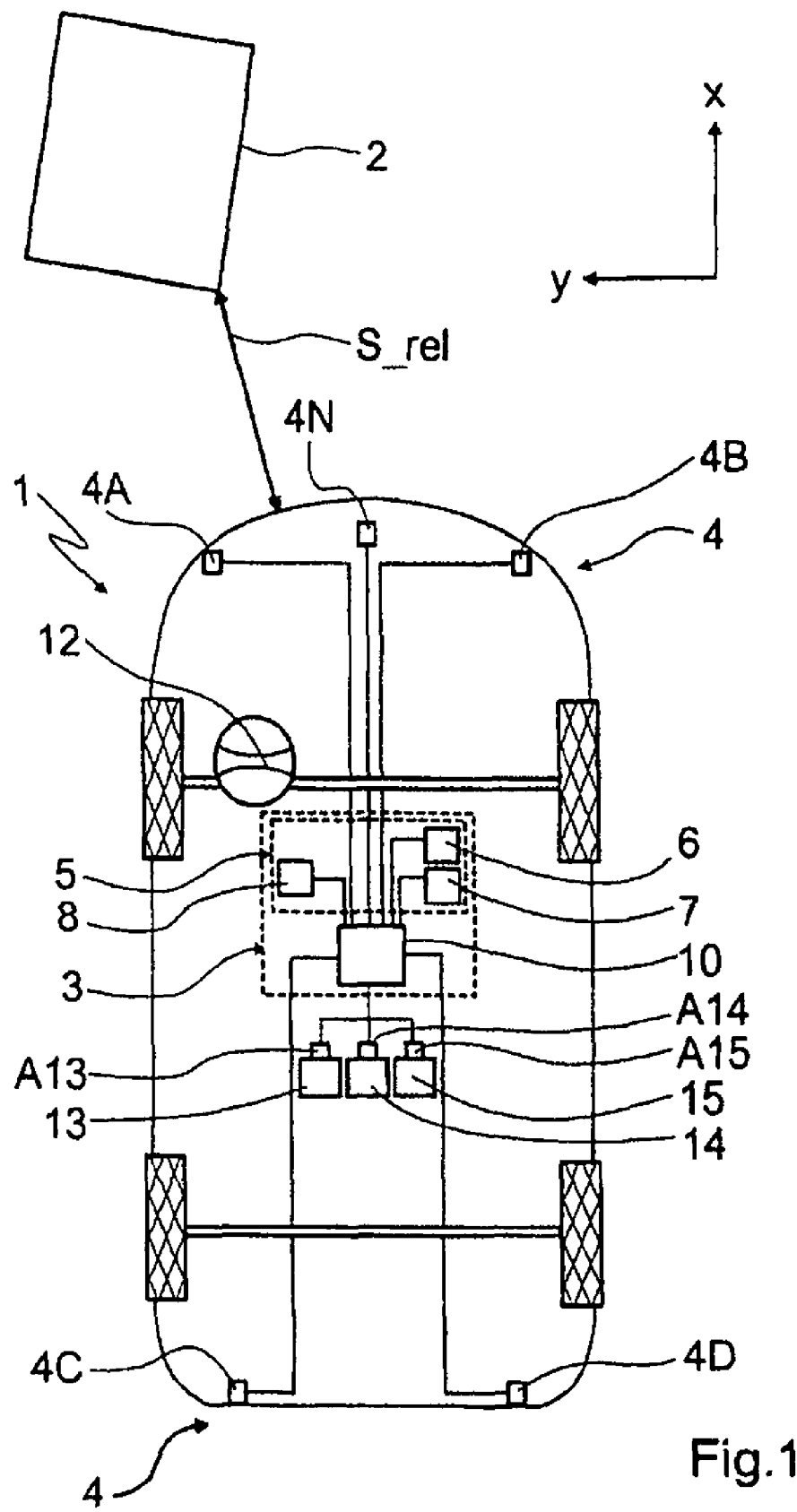
FIG. 1 shows a highly schematic plan view of a motor vehicle with a preventive protection system according to the invention.

FIG. 1 shows a motor vehicle 1 which can be embodied as a passenger car or as a utility vehicle, with essential components of a preventive protection system configured according to the invention.

The preventive protection system has, as an essential component, a safety sensor system 3 which comprises a vehicle surroundings detection device 4 and a driving situation data acquisition device 5 with a driving state sensor system 6, an impact sensor system 7 and a passenger compartment sensor system 8. The components of the safety sensor system 3 can be embodied here in a known fashion, for example in one of the designs which are described in the patent documents discussed above.

For example, the vehicle surroundings detection device 4 here is a 24 GHz radar near-field sensor system which is known per se and has a range of approximately 20 m to 30 m, and a plurality of distance sensors. Two of the distance sensors 4A, 4B are shown explicitly on the front of the vehicle, and two further distance sensors 4C, 4D of which are shown on the rear of the vehicle, in FIG. 1. Further distance sensors for monitoring the surroundings of the vehicle are indicated symbolically with the reference 4N.

The signals of the distance sensors 4A to 4N, as well as the signals of the other sensor systems, are processed in a data evaluation and control device 10, the signals of the distance sensors 4A to 4N being processed to form information about relative distances S_rel and relative velocities v_rel to a possible collision object 2 which can be another motor vehicle, an immovable obstacle or a pedestrian, as well as information about a possible impact angle.

The distance sensors 4A to 4N emit highly bundled electromagnetic waves in the form of short pulses. If they strike an object, these waves are reflected and by measuring the transit time of the pulse between the motor vehicle 1 as a transmission location and the collision object 2 as an echo location it is possible to determine the relative distance S_rel between these two objects. A relative velocity v_rel between the collision object 2 and the motor vehicle 1 can thus also be measured by using the Doppler effect.

Even in the normal operating mode, the driving state sensor system 6 analyzes important vehicle movement dynamics variables such as, for example, a vehicle velocity, wheel speeds, vehicle longitudinal acceleration and vehicle transverse acceleration, a yaw rate, spring compression travel and spring extension travel, the level of the vehicle as well as variables which are significant for the preventive protection system here, such as the accelerator pedal position, the accelerator pedal movement, the brake pedal position and the brake pedal movement as well as the steering wheel speed and the steering wheel acceleration. At the same time, actual values of these variables are compared with predefined setpoint values and threshold values. On the basis of these comparisons, vehicle movement dynamics systems such as, for example, an anti-lock brake system and an electronic stability program, which have the function of supporting the driver in situations which are critical in terms of driving in order to avoid an accident, are activated.

When there is an impact, the impact sensor system 7 detects it within a few milliseconds and passes on information about the severity of the accident to the data evaluation and control device 10. It is known to use in this context acceleration sensors, pressure sensors, intrusion sensors and contact sensors which are used to control pyrotechnic restraint systems, for example.

The vehicle situation data acquisition device 5 is supplemented by the passenger compartment sensor system 8 which supplies information here about the status of the vehicle occupants, the vehicle occupant position and the available restraint systems as well as physiological data of the driver. In order to sense the pulse frequency and thus to detect a panic reaction when a collision object is detected by the driver, corresponding sensors are provided in a steering wheel 12 of the motor vehicle 1 here.

Signals are output to actuators of safety devices 13, 14, 15 as a function of the data evaluation by the data evaluation and control device 10, a reversible seatbelt pretensioner 13 with an assigned actuator A13, a movable restraint upholstered element 14 with an assigned actuator A14 and a means of actuating an electric seat adjustment device 15 with an associated actuator A15 being shown here by way of example as safety devices. The safety devices 13, 14, 15 of the motor vehicle 1 are applied here in different stages as a function of the hazard level for the motor vehicle 1.

Figure 2:
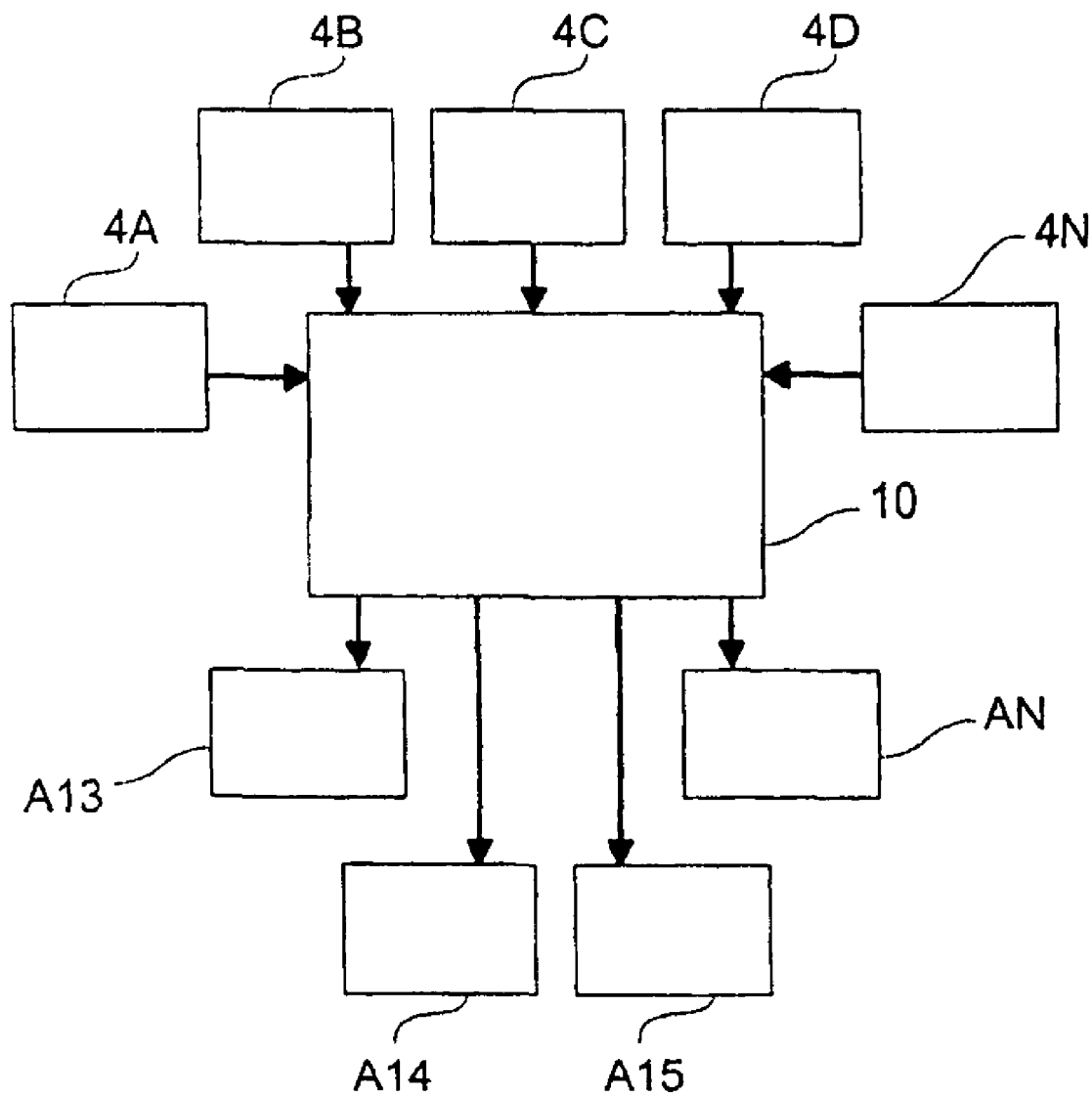
FIG. 2 shows a simplified system outline of the preventive protection system in a block diagram.

As is also apparent from FIG. 2, in addition to the aforementioned sensors it is also possible to provide numerous further sensors which are symbolized in FIG. 2 by a block 4N, as well as numerous further safety devices and associated actuators which are designated by a block AN in FIG. 2.

All the safety devices 13, 14, 15, or an individual one of them, are/is activated if the information from the vehicle surroundings detection device 4 represents an anticipated collision with the collision object 2, a remaining time TTC up to the collision being shorter than or equal to at least one of the activation time TTA of the actuators A13, A14, A15, AN of the associated safety devices. As a further condition it is possible to provide that the data of the driving situation data acquisition device 5 represents a driver behavior/vehicle behavior which is predefined for a collision plausibility check.

Figure 3:
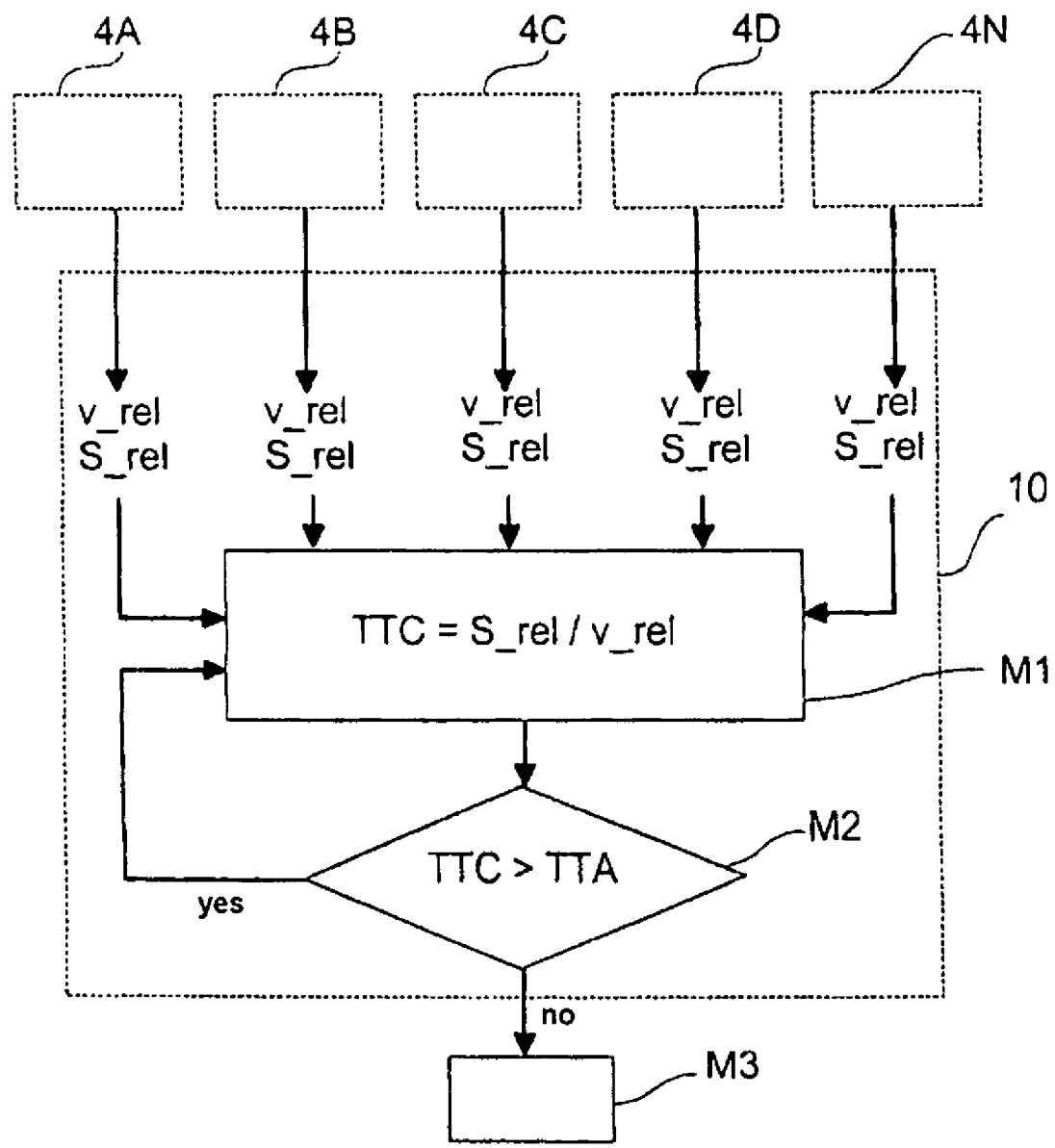
FIG. 3 is a simplified block diagram of a signal processing means for the preventive protection system.

FIG. 3 illustrates an algorithm which compares the necessary activation time TTA of the respective actuator A13, A14, A15, AN with respect to the remaining time TTC up to the collision, in a highly simplified signal processing flowchart.

It is clear here that the data which is acquired by the sensors 4A, 4B, 4C, 4N of the vehicle surroundings detection device 4 and which comprises the relative distance S_rel and relative velocity v_rel between the collision object 2 and the motor vehicle 1 is firstly conditioned mathematically in the data evaluation and control device 10 in order to calculate the remaining time TTC up to the collision.

For this purpose, in a first module M1, these variables are placed in relation to one another for the actuators 4A to 4N to be activated, as follows:

$$TTC = S\_rel / v\_rel$$

If the collision object 2 is sensed by more than one sensor, the shortest of the remaining times TTC is used for the further processing.

In a following module M2 it is then checked whether the remaining time TTC up to the collision is longer than the necessary activation time TTA of the actuators. If this is the case, the remaining time TTC up to the collision is calculated again for each cycle. This is the state in which the vehicle approaches the collision object but there is still sufficient time to move the safety devices into the operative position.

If the condition is no longer met, it is checked whether the remaining time TTC up to the collision is shorter than or equal to at least one of the activation times TTA of the actuators. At the latest as soon as these two times are the same, a module M3 with commands is started in order to activate the actuators A13 to AN of the assigned safety devices 13, 14, 15, for example in accordance with a predefined post-cascading.

For the sake of simplicity, FIG. 3 shows the simple case in which all the activation times TTA are the same, and then specifically the two interrogations explained coincide. If various activation times are to be taken into account, the interrogation in M2 becomes more complex, as explained above.

The triggering characteristic of the actuators is preferably configured here in such a way that the vehicle occupants are already secured prior to the collision and are placed in a seat position which is favorable for the impact, and that in addition absorption space is made available.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle protection system which comprises a plurality of safety devices that are actuated as a function of information from at least one vehicle surroundings detection device; wherein:
    a time remaining prior to a collision is determined if information from the at least one vehicle surroundings detection device represents an anticipated collision with a collision object;
    associated activation times for at least two actuators assigned to the respective safety devices are stored;
    the time remaining prior to the collision is compared with said activation times; and
    if the time remaining prior to the collision is shorter than or equal to at least one of the activation times of the actuators, only actuators whose activation time is shorter than or equal to the time remaining prior to the collision are activated simultaneously or successively, based on said stored activation times.

2. The vehicle protection system as claimed in claim 1, wherein, as the time remaining expires or is shortened, each actuator whose stored activation time is shorter than or equal to the remaining time is activated in sequence, according to the stored times.

3. The vehicle protection system as claimed in claim 1, wherein an actuator which has the longest of all the activation times which are shorter than or equal to the remaining time is determined as being the actuator which triggers first, and all the actuators are activated in accordance with a cascading rule which is referenced to the time of activation of the actuator that triggers first.

4. The vehicle protection system as claimed in claim 3, wherein activation of actuators is stored in a cascading rule, in a sequence with predetermined delay times following activation of the actuator that triggers first.

5. The vehicle protection system as claimed in claim 3, wherein the actuator which triggers first is activated when the time remaining is equal to its activation time.

6. The vehicle protection system as claimed in claim 1, wherein at least one actuator whose activation time is longer than the determined remaining time is triggered as soon as the information from the vehicle surroundings detection device represents an anticipated collision with a collision object.

7. The vehicle protection system as claimed in claim 1, wherein the vehicle surroundings detection device is configured to a minimum sensor range which is determined from a product of a predefined maximum relative velocity and a time value which corresponds to the necessary activation time of an actuator plus a necessary cycle time of the vehicle surroundings detection device, multiplied by a necessary number of sampling processes.

8. The vehicle protection system as claimed in claim 1, wherein a safety device is activated only if, in addition, the data from a driving situation data acquisition device represents a driver behavior/vehicle behavior which is predefined for a collision plausibility check.

9. The vehicle protection system as claimed in claim 8, wherein the data which represents a driver behavior/vehicle behavior for a collision plausibility check comprises at least one of an accelerator pedal position, an accelerator pedal movement, a brake pedal position and a brake pedal movement.

10. The vehicle protection system as claimed in claim 8, wherein the data which represents a driver behavior/vehicle behavior for a collision plausibility check comprises at least one of a steering wheel speed and a steering wheel acceleration in a predefined time, with respect to an actual velocity of the motor vehicle.

11. The vehicle protection system as claimed in claim 8, wherein the data which represents a driver behavior/vehicle behavior for a collision plausibility check comprises an operator control activity of an operator control element in a predefined time.

12. The vehicle protection system as claimed in claim 8, wherein the data which represents a driver behavior/vehicle behavior for a collision plausibility check comprises physiological data of the driver.

13. The vehicle protection system as claimed in claim 1, wherein the information which represents an anticipated collision with a collision object comprises at least one of a relative position and an offset of the collision object in the lateral direction.

14. A motor vehicle having a protection system which comprises a plurality of safety devices that are actuated as a function of information from at least one vehicle surroundings detection device; wherein:
   a time remaining prior to a collision is determined if information from the at least one vehicle surroundings detection device represents an anticipated collision with a collision object;
   associated activation times for at least two actuators assigned to the respective safety devices are stored;
   the time remaining prior to the collision is compared with said activation times; and
   if the time remaining prior to the collision is shorter than or equal to at least one of the activation times of the actuators, actuators whose activation time is shorter than or equal to the time remaining prior to the collision are activated simultaneously or successively, based on said stored activation times.

15. A vehicle protection system comprising:
   a plurality of safety devices, each of which is actuatable to protect vehicle occupants or other persons or property in the event of a crash;
   a plurality of actuators assigned respectively to each of said safety devices each of said actuators having an actuation time that is require to activate its assigned safety device to provide full protection;
   a memory having said activation times of each of said actuators stored therein;
   at least one sensor for detecting a distance to a potential collision object which enters a respective field of view of said at least one sensor;
   a data evaluation and control device which determines a time remaining until a possible collision with said potential collision object; wherein,
   upon detection of a potential collision object, said data evaluation and control unit causes only those of said safety devices whose actuators have an activation time that is less than the determined time remaining until a possible collision, to be actuated, in a sequence that is determined according to their stored activation times.

16. The vehicle protection system according to claim 15, wherein:
   a first safety device whose actuator has the longest activation time that is less than the time remaining until a possible collision is activated initially; and
   remaining safety devices whose activation time is less than the time remaining to a possible collision are activated after activation of the first safety device, based on one of i) a periodic recalculation of the time remaining until a possible collision and ii) a count down by a timer of the time following the initial determination of the time remaining.

17. The vehicle protection system according to claim 16, wherein:
   each of said remaining safety devices is activated when the time remaining until a possible collision becomes equal to the activation time of its assigned actuator, based on the activation time information stored in said memory.

18. The vehicle protection system according to claim 16, wherein each of said remaining safety devices is activated at a time interval following activation of the first safety device, based on differences between the activation times of said remaining safety devices, as stored in said memory.

* * * * *